UNITED STATES PATENT OFFICE 2,502,196

METHOD OF STERILIZING FOOD PRODUCTS

Charles Olin Ball, Maumee, Ohio, assignor to The United Products Company, Westminster, Md., a corporation of Maryland No Drawing. Application January 14, 1949, Serial No. 71,025

24 Claims. (Cl. 99—186)

This invention relates to food products and more particularly to processes for the sterilization of canned food products.

An object of this invention is to produce canned food products which are free from active spoilage bacteria and the flavor and texture of which are not impaired by prolonged periods of sterilization.

Another object of this invention is to sterilize efficiently and economically canned food products containing a coarse component and a fine component.

Another object of this invention is to effect the sterilization of canned food products in materially shorter periods than that obtained by currently used practices.

In the processing of canned food products, such as succotash, produced by the mixing of discrete particles and a finely divided component of the same or a different species of food, it is essential that the contents of the can be thoroughly sterilized after sealing to ensure the destruction of spoilage bacteria. By currently used practices, however, the time required at elevated temperatures for the sterilization of canned food products of commercial size, such as the No. 2 or No. 10 can, is of such relatively long duration that serious impairment of the flavor and texture of the product frequently results. Because of this impairment in the organoleptic quality of certain products, such as succotash, it has been the practice in the commercial packing of these products to establish the time and temperature of sterilization at the lowest values which give reasonable protection against bacterial spoilage. But even though the time and temperature be carefully determined and used, some impairment of the organoleptic quality of the product results because of the relatively long time required. Any substantial deviation from the established limits of time and temperature results either in serious impairment of the flavor, texture and other qualities of the product if the time be too long or the temperature too high, or in spoilage of the product if the time be too short or the temperature too low to effect destruction of spoilage bacteria.

In accordance with this invention, canned food products prepared from discrete particles of a food product and a finely divided component of the same or of a different specie of food in a liquid such as an added aqueous liquid, are produced which are adequately sterilized and the organoleptic quality of which is not impaired as when currently used processes are employed for the sterilization. Succotash or beans in tomato pulp are examples of such food products. Moreover, the time required for sterilization of the canned food product by the practice of this invention is materially less than by currently used processes and, because of this saving in time, it becomes practical to process certain canned food products in a continuous cooker as well as in a batch cooker such as is now used.

Food products which are adapted to be sterilized in accordance with this invention are a mixture of 30 to 65%, and preferably 45 to 60% by weight, of discrete particles of a food product, and a sauce containing 8 to 90%, and preferably 35 to 60% by weight, of a finely divided food product in an added liquid such as an added aqueous liquid. The discrete particles may be the same or a different specie from the finely divided component. Succotach is an example of such a food product in which whole lima beans are the discrete particles and finely divided corn grains constitute the finely divided component. Desirably, at least 90%, and preferably at least 98% by weight, of the discrete particles of the food product are capable of being retained on an 8-mesh sieve, while desirably 50 to 100%, and preferably 80 to 100% by weight, of the finely divided component. Succotash is an example of such food the added aqueous liquid, is capable of passing through an 8-mesh sieve. The added aqueous liquid may, and usually does, contain sufficient seasoning ingredients, such as sugar and salt, to improve the taste of the resulting product and it may contain edible oil. The added liquid, in fact, may be of non-aqueous composition provided it has approximately the same consistency as the aqueous liquid described herein. The added aqueous liquid may also contain other ingredients, such as minerals or water soluble vitamins. The terms, "added aqueous liquid" and "added water," in the claims therefor means added aqueous liquid or added water which may or may not contain ingredients such as sugar, salt, minerals or water soluble vitamins.

The "added liquid," "added aqueous liquid" or "added water" may not contain any finely divided component. Accordingly, the expressions in the claims of the added liquid, added aqueous liquid or added water which contains not more than 35%, or not more than 25%, of its weight of finely divided component embrace within their purview added liquid, added aqueous liquid or added water which may or may not contain any finely divided component, the only limitation in the claims being that if the added liquid or added water does contain finely divided component, the added liquid or added water does not contain more than 25% or 35% of its weight of the finely divided component, as specifically denoted in the claims. Also, when during sterilization the "added liquid," "added aqueous liquid" or "added water" contains no, or substantially no, finely divided food product, finely divided component or fine component, the terms "remainder of said finely divided food product," "remainder of said finely divided component" and "remainder of said fine component" in the claims mean in such situations all, or substantially all, of the finely divided food product or finely divided component or fine component which is contained in the final food product. The terms in the claims, then, relating to the remainder of the finely divided component, fine component or finely divided food product cover situations where, during sterilization, the liquid or water may or may not contain such components or finely divided food products.

The discrete particles of the food product are sufficiently rigid in structure to enable them, when packed together, to maintain their individual natural contours and thus provide interstices among the particles within which a fluid may move about with a reasonable degree of freedom. Corn, peas, beans and diced sections of root and tuber vegetables, for example, potatoes, beets and carrots, as well as certain fruits such as Bing and Royal Ann cherries, diced peaches and diced apples are examples of discrete particles which are sufficiently rigid to permit a reasonable degree of freedom of a fluid among the interstices created by the packing of such discrete particles.

In the process of this invention, the discrete particles of the food product, the finely divided food product or component and the added liquid such as the added aqueous liquid are placed in a container in such a manner and sterilized under such conditions that, during sterilization, the added liquid such as the added aqueous liquid of the food product is mixed with not more than 35%, and preferably not more than 25%, of its own weight of the finely divided food product, while the discrete particles and the remainder of the finely divided food product which is not contained in the added liquid are substantially stratified in layers. It is essential that during the sterilization the stratified layers of the discrete particles and the finely divided component be maintained and that there be no substantial mixing of the strata during sterilization. After the sterilization, the discrete particles and the finely divided component may, if desired, be thoroughly mixed to ensure a uniform distribution of the discrete particles and finely divided component throughout the can.

In the practice of this invention, any method of filling the cans with the food product prior to sterilization may be used which effects the stratification of the finely divided component and the discrete particles and which ensures that the added liquid such as the added aqueous liquid is mixed with not more than 35%, and preferably not more than 25%, of its own weight of the finely divided component. When during sterilization the finely divided component and the discrete particles are so arranged, the heat penetrates among and through the discrete particles of the product rapidly since, when the added liquid is an aqueous liquid, the interstices of the discrete particles are filled either with the added aqueous liquid or with steam. Since the discrete particles constitute from 30 to 65%, and preferably 45 to 60%, such as about 50% of the total weight of food product in the container, since the layer or layers of concentrated finely divided component of the product are located between the discrete particles and the wall or end of the container, and since the temperature rises rapidly within the mass of discrete particles, the temperature also rises rapidly at all faces of the comparatively thin layer or layers of concentrated finely divided component. The layer or layers of finely divided component constitute the only segregated portions of the product through which convection currents do not operate to carry heat into the product. Since these layers are comparatively thin, heat penetrates through them by conduction in a comparatively short time. In the process of sterilization in accordance with this invention, the rate of flow of heat is affected very little, if at all, by wide variation in moisture content of the finely divided product. For example, heat flows through a finely comminuted succulent food product to which no aqueous liquid has been added at practically the same rate as it flows after the volume of the finely divided component is doubled by mixing with water. Through delay of the mixing of the liquid with the concentrated finely divided component and through delay of dispersion of the finely divided component into the interstices of the discrete particles until after sterilization has been completed, it is possible to sterilize a food product in approximately 60% of the time that would be required if the sauce comprising the finely divided component and liquid were mixed prior to sterilization. A measure of the magnitude of the difference in heat penetration effected by the practice of the processes of this invention over currently used processes is illustrated by reference to the recommendations of the National Canners' Association for the processing of cream style corn by currently used processes of sterilization. The National Canners' Association recommend a period of sterilization at 240° F. of 90 minutes for a No. 2 can and 180 minutes for the No. 10 can. Similar effective sterilization by the processes of this invention is produced at 240° F. in 60 minutes for the No. 2 can and 115 minutes for the No. 10 can. In fact, it has been found that where the same initial temperature and same processing temperature are employed in the sterilization of cream style corn in 303 cans, a period of 42 minutes of sterilization in accordance with this invention is equivalent in sterilizing value to a period of 67 minutes for cream style corn by currently used processes.

One satisfactory method for filling the cans by the practice of this invention is to pour into the can the discrete particles and added liquid to form a layer after which the finely divided component is poured into the can to form a layer on top of the discrete particles. In this manner, the finely divided component and the discrete particles containing the added liquid form two layers or strata and the added liquid is mixed with not more than 35%, and preferably not more than 25% of its own weight, of the finely divided component. The can may then be sealed in a conventional manner, such as by subjection to a vacuum greater than ½ atmosphere and hermetically sealing the can. Regardless of the manner of sealing, however, it is essential that there is no disturbance of the strata of the finely divided component and discrete particles during that step in the process. The contents of the can is then sterilized, and during sterilization it is also essential that there be no substantial mixing of the two layers. After the sterilization has been completed, the food product may be agitated, if desired, to ensure the uniform distribution of each of the components throughout the can.

Another method of filling the can prior to sterilization is to place a layer of the finely divided component in a container followed by a layer of the discrete particles of the food product with the added liquid, such as water. The container may then be sealed and sterilized while maintaining the strata in the position in which the components are poured in the container or the container, after sealing, may be rotated approximately 180° and the canned food product sterilized so that the finely divided component constitutes the upper layer during the sterilization and the added liquid occupies the interstices between the discrete particles. This latter procedure is more desirable since the finely divided component, if allowed to remain in the bottom of the container during the process frequently becomes packed in the bottom of the container, particularly if the period between the filling of the can and the sterilization is prolonged. As a result of this packing of the finely divided component, the finely divided component does not mix readily with the discrete particles upon shaking after sterilization. If desired, after the can has been rotated approximately 180° so that the finely divided component is in the upper portion of the can, the can and its contents may be held before sterilization for a period up to five hours within a medium maintained at a temperature between 50° and 160° F. without causing any reduction in the rate of heating of the product during the sterilizing process. Certain products may be heated to higher temperatures, such as 180° or 200° F., without any substantial impairment in the rate of heating during the subsequent sterilizing process.

Another method of filling the container is to place a layer of finely divided component in the can followed by a layer of the discrete particles of the food product with the added liquid and finally followed by a layer of the finely divided component. The can is then sealed and the contents sterilized under conditions so that there is no appreciable intermixing of the three layers. In addition, it is of course also essential that the added liquid be mixed with not more than 35%, and preferably not more than 25%, of its own weight of the finely divided component.

The sterilization may be effected with the can or container in any position as long as the strata of finely divided component and discrete particles with the added liquid are maintained. For example, the sterilization may be conducted by applying a fluid medium, such as steam, to the outsides of the cans when the cans are positioned so that the longitudinal axis of the container is in a substantially vertical position during the sterilization, or again, the longitudinal axis of the container may be maintained in a substantially horizontal position during the sterilization. Any method of heating may be used which raises the temperature of the contents of the can sufficiently high to destroy or render ineffective the spoilage bacteria contained within the can. One method which is particularly effective is the conventional process of subjecting the outside of the cans to a heated fluid medium. The temperature of the fluid medium, such as steam, employed for the sterilization may be within the usual conventional range of temperatures employed for this purpose, such as between 240 and 260° F.

While the temperatures of the finely divided component, discrete particles and the added liquid at the time they are placed in the container may be at that of the room (e. g. 50 to 70° F.), it may be advantageous in some cases to mix the added aqueous liquid with a portion of the finely divided component, not exceeding 35%, and preferably not exceeding 25%, of the weight of the added aqueous liquid before mixing, heating the mixture of added aqueous liquid with the portion of finely divided component in it to a temperature which, in case the mixture of aqueous liquid and finely divided component contains more than two percent of starch, is not higher than 180° F., partially filling the container with the mixture, then adding the discrete particles and the remainder of the finely divided component which is unmixed with the added aqueous liquid in such a manner that the discrete particles and the remainder of the finely divided component which is unmixed with the added aqueous liquid form two adjacent, unmixed, separate layers and the added aqueous liquid is contained in the interstices of the discrete particles. Another modification which may be practiced in the filling of the container prior to sterilization is to add separately the finely divided component and the discrete particles, both of which are unheated, and then adding the added aqueous liquid at a temperature of 50 to 212° F. so that stratified layers of the discrete particles and the finely divided component are formed and the finely divided component is substantially unmixed with the discrete particles and the added water. The container is then sealed and sterilized as heretofore described.

With respect to the heating of the components prior to their introduction into the containers, it may be stated that the discrete particles and finely divided component may or may not be heated to a temperature between 105° F. and the boiling temperature at atmospheric pressure.

As previously discussed, it is desirable that at least 90%, and preferably at least 98% by weight, of the discrete particles be capable of being retained on an 8-mesh sieve, while desirably 50 to 100%, and preferably 80 to 100% by weight, of the finely divided component without the added aqueous liquid be capable of passing through an 8-mesh sieve. It is also advantageous that 50% by weight of the discrete particles be capable of being retained on a 4-mesh sieve, that substantially none of the discrete particles be capable of passing through a 14-mesh sieve, that substantially all the finely divided component pass through a 4-mesh sieve and that a minimum of 25% by weight of the finely divided component without the added water be capable of passing through a 14-mesh sieve.

If the canned food product be considered from the standpoint of the finished product rather than from the standpoint of the components which are added to make up that product, it is desirable that the resulting culinary product contain at least 3.5% by weight of a liquid such as an added aqueous liquid, that 25 to 80%, and preferably 45 to 65% by weight, of the resulting composite culinary product be a course component which is capable of being retained on an 8-mesh sieve, and that 20 to 75%, and preferably 35 to 55% by weight, be a fine component which is capable of passing through an 8-mesh sieve. But whether the canned food product be considered from the standpoint of the ingredients which are employed to prepare it or from the standpoint of the finished product, it is essential that during sterilization the added liquid contain not more than 35%, and preferably not more than 25% of its own weight before mixing, of the fine component or the finely divided component and that the remainder of the fine component or finely divided component and the discrete particles or coarse component be substantially stratified in layers.

When the finely divided component of the food product contains appreciable starch, it is essential that the sterilization be effected under such conditions that the added liquid such as water be mixed with not more than 4% of its own weight of starch derived from both the finely divided component and the discrete particles. Otherwise, heat penetration during sterilization will be markedly retarded.

Examples of food products which may be produced in accordance with this invention, are succotash in which the discrete particles are discrete particles of lima beans and the finely divided component is finely divided corn grains with added water; or culinary seeds or legumes such as peas or beans in which the discrete particles may be the same specie as the finely divided component such as whole or half peas in a matrix of finely divided peas with added water, or lima beans in a matrix of peas with added water; or culinary seeds or legumes with another food such as discrete particles of mature whole beans with discrete particles of pork and finely divided tomato pulp with water containing salt, sugar and tomato juice as the added aqueous liquid.

A more comprehensive understanding of this invention is obtained by reference to the following examples:

*Example 1.—Sterilization of canned succotash*

Succotash of this example is made from succulent lima beans, succulent sweet corn, and water containing sugar and salt.

The beans are removed from the pods by hand or by machine, are cleaned, and are then sorted for size and maturity. These operations are usually carried out mechanically, although a step in the cleaning is usually accomplished by hand picking as the beans are conveyed on a wide belt. Beans within chosen ranges for size and maturity are selected for use in the succotash. The beans are blanched in boiling water for from four to six minutes to remove bitterness; they may then be soaked in cold water.

After the ears of corn are husked mechanically, the corn kernels are cut from the cobs in the manner followed by packers of whole-kernel corn. The cut kernels are silked, screened, and thoroughly washed and inspected to ensure the absence of silks, husks, cob tissues and other foreign substances. The corn may also be sorted for maturity by a suitable method. After the kernels have been prepared and selected according to the standards set for the product, the kernels are treated mechanically to reduce them to a product of creamy consistency, containing, in finely comminuted form, all of the components of the kernels. The corn kernels are comminuted sufficiently so that at least 75% by weight of the product which is to be used as the finely divided component passes through an 8-mesh sieve. If it is desired to include corn kernels in the discrete portion of the product, the most succulent kernels are retained in whole form and are mixed in proper proportions with the lima beans before the product is filled into the containers.

The composition of the brine may be varied according to the characteristics of the corn and beans to be used, but a typical brine is made by dissolving 11 pounds, 10 ounces of sugar and 2 pounds, 8 ounces of salt in 10 gallons of water.

The components of the succotash are now ready to be filled into the containers. A typical filling procedure for #2 cans is first to put in 5.7 ounces of corn cream, then 10.8 ounces of lima beans or of a mixture of lima beans and corn kernels, then 4.7 ounces of brine. The can is immediately sealed under a vacuum equal to 17 inches of mercury and is immediately inverted so that the layer of corn cream is on top of the layer of lima beans or of the mixture of lima beans and corn kernels, which are mixed with brine. In this position, the can is enclosed within a retort and processed for 46 minutes at 250° F. if the ingredients are filled at a temperature of 150° F. If the ingredients are of a lower temperature than 150° F. when filled, a longer period is required for sterilization. After sterilization, the can may be agitated to ensure a uniform distribution of all components throughout the product.

*Example 2.—Sterilization of canned pork and beans in tomato sauce*

Pork and beans in tomato sauce are ordinarily made from dried white beans, usually called pea beans, either fresh or salted pork, tomato pulp, seasoning ingredients, and water.

The beans are properly sorted by any well-known method. They are soaked for from ten to sixteen hours in water of the proper degree of hardness, with several changes of water during the soaking period. The beans are blanched either mechanically or by hand for from two to five minutes in water at a temperature of 180° to 210° F.

The concentrated sauce which will form the finely divided component is formulated by mixing together forty gallons of tomato pulp of specific gravity, 1.035, fifty-five ounces of chopped onions, thirty pounds of sugar, three-fourths gallon of vinegar, and nine ounces of a mixture of allspice, cinnamon, cloves, and mace in the proportions desired. The mixture is reduced by boiling to a weight of approximately 330 pounds.

Brine is prepared by mixing into 100 gallons of water, one-half gallon of vinegar, seven ounces of ground garlic, fifteen pounds of salt, seventeen pounds of sugar, and three ounces of a mixture of allspice, cinnamon, cloves, and mace in the desired proportions. The composition of the brine may be varied according to the characteristics desired in the final product and according to the characteristics of the beans used.

The pork is cut into small pieces of the size which it is desired to use in the container.

The components of the product are now ready to be filled into the containers. A typical filling procedure for No. 2 cans is first to put in 2.7 ounces of the concentrated sauce, then the piece of pork, then 11 ounces of soaked, blanched beans, then 7 ounces of brine. The can is immediately sealed and then inverted so that the layer of concentrated sauce is on top of the layer of beans, which are mixed with brine. In this position, the can is enclosed in a retort and processed for 60 minutes at 240° F. if the ingredients are filled at a temperature of 150° F. If the ingredients are at a lower temperature than 150° F. when filled, a longer process is used. After sterilization, the can may be agitated to effect a substantially uniform distribution of the components throughout the product.

*Example 3.—Sterilization of canned beef cubes in gravy*

Beef cubes in gravy are canned in essentially the same manner as pork and beans in tomato sauce described in Example 2. Cubes of lean beef, measuring approximately 3/8" in each dimension, are par-boiled for approximately ten minutes in preparation for canning. A concentrated mixture of the solid materials which are used to make beef gravy is prepared to form the finely divided component. The broth from the par-boiled beef cubes, or other beef broth, is made into a salt brine. A No. 2 can is filled by first putting in approximately five ounces of the concentrated gravy solids, then approximately eleven ounces of the par-boiled beef cubes, then approximately five ounces of the brine. The sealing and processing are done in the same manner as with pork and beans in tomato sauce described in Example 2.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The process of sterilizing a composite culinary product containing 30 to 65% of discrete particles of a food product and the remainder a sauce containing 8 to 90% of a finely divided food product in added liquid, said process comprising sterilizing said composite culinary product in a container while said added liquid contains not more than 35% of its weight of said finely divided food product and while said discrete particles and the remainder of said finely divided food product are substantially stratified in layers.

2. The process of sterilizing a composite culinary product containing 30 to 65% of discrete particles of a food product and the remainder a sauce containing 8 to 90% of a finely divided food product containing starch in added aqueous liquid, said process comprising sterilizing said composite culinary product in a container while said added aqueous liquid contains not more than 35% of its weight of said finely divided food product and not more than 4% of its weight of starch derived from said finely divided food product and from the discrete particles of food product and while said discrete particles and the remainder of said finely divided food product are substantially stratified in layers.

3. The process of sterilizing a food product containing 30 to 65% of discrete particles of culinary seeds and the remainder a sauce containing 8 to 90% of a finely divided food product in added water, said process comprising sterilizing said product in a container while said added water contains not more than 35% of its weight of said finely divided component and while said discrete particles and the remainder of said finely divided food product are substantially stratified in layers.

4. The process of sterilizing a food product containing 30 to 65% of discrete particles of said product, at least 90% of which are capable of being retained on an 8-mesh sieve, and the remainder a sauce containing 8 to 90% of finely divided component of said product in added liquid, 50 to 100% of said finely divided component before being mixed with the added liquid being capable of passing through an 8-mesh sieve, said process comprising sterilizing said product in a container while said added liquid contains not more than 35% of its weight of said finely divided component and while said discrete particles and the remainder of said finely divided component are substantially stratified in layers.

5. The process of sterilizing a food product in accordance with claim 4, in which said discrete particles are discrete particles of legumes.

6. The process of sterilizing a food product in accordance with claim 4, in which said discrete particles are discrete particles of lima beans and said finely divided component is finely divided corn grains.

7. The process of sterilizing a food product in accordance with claim 4, in which said discrete particles are discrete particles of peas and said finely divided component is finely divided peas.

8. The process of sterilizing a food product in accordance with claim 4, in which said discrete particles are discrete particles of mature beans and pork and said finely divided component is finely divided tomato pulp.

9. The process of sterilizing a composite culinary product, 25 to 80% of said culinary product being a coarse component which is capable of being retained on an 8-mesh sieve and 20 to 75% of said culinary product being a fine component capable of passing through an 8-mesh sieve, and said culinary product containing at least 3.5% of an added aqueous liquid, said process comprising sterilizing said product in a container while said added aqueous liquid contains not more than 35% of its weight of said fine component and while said coarse component and the remainder of said fine component are substantially stratified in layers.

10. The process of sterilizing a composite culinary product, 45 to 65% of said culinary product being a coarse component which is capable of being retained on an 8-mesh sieve and 35 to 55% of a fine component capable of passing through an 8-mesh sieve and said culinary product containing at least 3.5% of an added aqueous liquid, said process comprising sterilizing said product in a container while said aqueous liquid contains not more than 25% of its weight of said fine component and while said coarse component and the remainder of said fine component are substantially stratified in layers.

11. The process of sterilizing a composite culinary product, 25 to 80% of said culinary product being a coarse component which is capable of being retained on an 8-mesh sieve, the remainder of the solid portion of said culinary product being a fine component which is capable of passing through an 8-mesh sieve and said culinary product containing at least 3.5% of an added aqueous liquid, said process comprising sterilizing said product in a container while said added aqueous liquid contains not more than 35% of its weight of said fine component and while said coarse component and the remainder of said fine component are substantially stratified in layers.

12. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising adding to a container said discrete particles, said added water containing not more than 35% of its weight of said finely divided component, and the remainder of said finely divided component, hermetically sealing said container and sterilizing the container and the contents thereof while maintaining said discrete particles and said remainder of said finely divided component in strata.

13. The process of sterilizing a food product containing 45 to 60% of discrete particles of said product, at least 98% of which are capable of being retained on an 8-mesh sieve and the remainder a sauce containing 35 to 60% of finely divided component of said food product in added water, 80 to 100% of said finely divided component before being mixed with water being capable of passing through an 8-mesh sieve, said process comprising adding to a container said discrete particles, said added water containing not more than 25% of its weight of said finely divided component, and the remainder of said finely divided component, hermetically sealing and sterilizing the container and the contents thereof while maintaining said discrete particles and said remainder of said finely divided component in strata.

14. The process of sterilizing a food product containing 45 to 60% of discrete particles of said product, at least 98% of which are capable of being retained on an 8-mesh sieve and the remainder a sauce containing about 50% of finely divided component of said food product in added water, 80 to 100% of said finely divided component before being mixed with water being capable of passing through an 8-mesh sieve, said process comprising adding to a container said discrete particles, said added water containing not more than 25% of its weight of said finely divided component and the remainder of said finely divided component, hermetically sealing said container and sterilizing the container and the contents thereof while maintaining said discrete particles and said remainder of said finely divided component in strata.

15. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising adding successively to a container a portion of said finely divided component, said discrete particles, said added water and the remaining portion of said finely divided component, hermetically sealing said container, sterilizing said container and the contents thereof while said discrete particles and said finely divided component are substantially stratified in layers and while said added water contains not more than 35% of its weight of said finely divided component and after sterilization agitating the container to ensure a uniform distribution of said discrete particles and said finely divided component throughout the product.

16. The process of sterilizing a food product containing 45 to 60% of discrete particles of said product, at least 98% of which are capable of being retained on an 8-mesh sieve and the remainder a sauce containing 8 to 90% of finely divided component of said food product in added water, 80 to 100% of said finely divided component before being mixed with water being capable of passing through an 8-mesh sieve, said process comprising successively adding said finely divided component, said discrete particles and said added water containing not more than 35% of its weight of said finely divided component to a container, hermetically sealing the container without disturbing substantially the strata of said finely divided component and said discrete particles and sterilizing the container and contents thereof while said added water contains not more than 35% of its weight of said finely divided component and while maintaining substantially the strata of said discrete particles and said finely divided component.

17. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising adding said discrete particles and said finely divided component to a container to effect a stratification in the container of one layer of said discrete particles between two layers of said finely divided component, sealing the container and sterilizing the container and its contents while said added water contains not more than 35% of its weight of said finely divided component and while maintaining substantially the strata of said discrete particles of said finely divided component, said container during sterilization being so positioned that the longitudinal axis of the container is in a substantially horizontal position.

18. The process of sterilizing a food product containing 45 to 60% of discrete particles of said product, at least 98% of which are capable of being retained on an 8-mesh sieve and the remainder a sauce containing 8 to 90% of finely divided component of said food product in added water, 80 to 100% of said finely divided component before being mixed with water being capable of passing through an 8-mesh sieve, said process comprising mixing said added water with a portion of said finely divided component, not exceeding 25% of the weight of said added water, filling a container with the resulting mixture, said discrete particles and the remainder of said finely divided component which is unmixed with the added water so that said discrete particles and said remainder of said finely divided component form separate strata and are substantially unmixed with each other, hermetically sealing the container and sterilizing the container and its contents while maintaining substantially the strata of said discrete particles and said remainder of said finely divided component.

19. The process of sterilizing a food product containing 45 to 60% of discrete particles of said product, at least 98% of which are capable of being retained on an 8-mesh sieve and the remainder a sauce containing 35 to 60% of finely divided component of said food product in added water, 80 to 100% of said finely divided component before being mixed with water being capable of passing through an 8-mesh sieve, said process comprising mixing the added water with a portion of said finely divided component, not exceeding 25% of the weight of said added water, filling a container with said discrete particles including said added water in the interstices among said discrete particles and the remainder of said finely divided component which is unmixed with the added water so that said discrete particles and said remainder of said finely divided component which is unmixed with water form separate strata and are substantially unmixed with each other, hermetically sealing the container and sterilizing the container and its contents while maintaining substantially the strata of said discrete particles and said remainder of said finely divided component.

20. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising mixing with the added water a portion of said finely divided component, not exceeding 35% of the weight of said added water, heating the mixture of added water and said finely divided component to a temperature not higher than 180° F., filling the container with said mixture, said discrete particles and the remainder of said finely divided component which is unmixed with the added water so that said discrete particles and said remainder of said finely divided component which is unmixed with added water form separate strata and are substantially unmixed with each other while said added water is in the interstices of said discrete particles, hermetically sealing the container and sterilizing the container and its contents while maintaining substantially the strata of said discrete particles and said remainder of said finely divided component.

21. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising adding separately said finely divided component, said discrete particles, both of which are unheated, and said added water at a temperature of 50° to 212° F. so that stratified layers of said discrete particles and said finely divided component are formed, and said finely divided component is substantially unmixed with said discrete particles and said added water, sealing said container and sterilizing said container and the contents thereof while maintaining said finely divided component and said discrete particles in strata.

22. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising adding separately said finely divided component, said discrete particles, both of which are maintained at a temperature of 50° to 212° F., and said added water at a temperature of 50° to 212° F. so that stratified layers of said discrete particles and said finely divided component are formed, and said finely divided component is substantially unmixed with said discrete particles and said added water, sealing said container and sterilizing said container and the contents thereof while maintaining said finely divided component and said discrete particles in strata.

23. The process of sterilizing a food product containing 30 to 65% of discrete particles of said product, at least 90% of which are capable of being retained on an 8-mesh sieve and the remainder a sauce containing 8 to 90% of finely divided component of said food product in added water, 50 to 100% of said finely divided component before being mixed with water being capable of passing through an 8-mesh sieve, said process comprising adding said discrete particles and said finely divided component to a container to effect a stratification in a container of one layer of said discrete particles between two layers of said finely divided component, sealing the container and sterilizing the container and its contents while said added water contains not more than 35% of its weight of said finely divided component and while maintaining substantially the strata of said discrete particles and said finely divided component.

24. The process of sterilizing a food product containing 30 to 65% of discrete particles of said food product and the remainder a sauce containing 8 to 90% of finely divided component of said food product in added liquid, said process comprising sterilizing said food product in a container while said added liquid contains not more than 35% of its weight of said finely divided component, while said discrete particles and said finely divided component are substantially stratified in layers and while said stratified layers extend longitudinally in said container.

C. OLIN BALL.

REFERENCES CITED

The following references are of record in the file of this patent:

UNITED STATES PATENTS

| Number | Name | Date |
| --- | --- | --- |
| 1,940,773 | Sells | Dec. 26, 1933 |
| 2,217,698 | Musher | Oct. 15, 1940 |
| 2,232,282 | Struble | Feb. 18, 1941 |